(12) United States Patent
Inoue et al.

(10) Patent No.: US 7,831,344 B2
(45) Date of Patent: Nov. 9, 2010

(54) VEHICLE DRIVING FORCE CONTROL DEVICE

(75) Inventors: Koichi Inoue, Tokyo (JP); Keisuke Hosokawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1026 days.

(21) Appl. No.: 11/600,082

(22) Filed: Nov. 16, 2006

(65) Prior Publication Data

US 2007/0118268 A1 May 24, 2007

(30) Foreign Application Priority Data

Nov. 22, 2005 (JP) ............... 2005-337522

(51) Int. Cl.
*B60K 28/16* (2006.01)
(52) U.S. Cl. ........................... 701/23; 180/197
(58) Field of Classification Search ................... 701/23, 701/70–73, 80; 180/197, 6.2; 477/120
See application file for complete search history.

(56) References Cited

U.S. PATENT DOCUMENTS

| 5,255,192 A * | 10/1993 | Ito et al. ............... 701/90 |
| 5,742,917 A | 4/1998 | Matsuno |
| 5,927,421 A | 7/1999 | Fukada |
| 6,412,886 B1 | 7/2002 | Abe et al. |
| 2001/0014845 A1 * | 8/2001 | Minowa et al. ............... 701/84 |
| 2004/0215385 A1 * | 10/2004 | Aizawa et al. ............... 701/93 |

FOREIGN PATENT DOCUMENTS

| DE | 195 12 441 A1 | 10/1995 |
| DE | 197 12 232 A1 | 10/1997 |
| DE | 102 05 039 A1 | 8/2003 |
| JP | 8-002274 | 1/1996 |
| JP | 2003-227385 | 8/2003 |

OTHER PUBLICATIONS

European Search Report corresponding to European Application No. 06124478.6 dated Mar. 26, 2007.

* cited by examiner

*Primary Examiner*—Dalena Tran
(74) *Attorney, Agent, or Firm*—Smith, Gambrell & Russell, LLP (57) ABSTRACT

In a throttle valve control device, an engine required output setting section sets an engine required output corresponding to an accelerator opening degree by means of selecting a characteristic which is varied depending on a road surface friction coefficient or by means of interpolation calculation based on a road surface friction coefficient. An engine required torque setting section sets an engine required torque based on an engine speed and the engine required output. A throttle opening degree setting section sets a throttle opening degree based on the engine speed and the engine required torque and outputs a signal corresponding to the throttle opening degree to a throttle motor.

7 Claims, 6 Drawing Sheets

VEHICLE DRIVING FORCE CONTROL DEVICE

This application claims benefit of Japanese Application No. 2005-337522 filed on Nov. 22, 2005, the contents of which are incorporated by this reference.

BACKGROUND OF THE INVENTION

1. Field of the Invention

The present invention relates to a vehicle driving force control device capable of generating an appropriate driving force in response to changing road surface condition.

2. Description of the Related Art

In recent years, various vehicles which are equipped with an electronic controlled throttle valve capable of arbitrarily setting a driving force of the vehicle to accelerator operation of a driver as a vehicle driving force control device have come into practical use.

For example, in Japanese Unexamined Patent Application Publication No. 2003-227385, a technique that in a vehicle equipped with an electronic controlled throttle valve having a traction control function, when deceleration of a target torque of an engine is carried out by the traction control, it is forbidden to employ a control method of feedback control as the control of the electronic controlled throttle valve for approximating an actual engine torque to the target torque of the engine by the traction control has been disclosed.

However, in the technique for electronic controlled throttle valve discussed in the above-described Japanese Unexamined Patent Application Publication No. 2003-227385, because driving force control is carried out after the traction control is operated, the responsiveness is slow. Accordingly, it can be assumed to provide a driving force characteristic (characteristic of a driving force of a vehicle to an accelerator operation of a driver) which does not previously require traction control. However, if the characteristic is set based on drivability on a road having high friction coefficient, it is apt to slip on a road having low friction coefficient, and on the contrary, if the characteristic is set based on the drivability on the road having the low friction coefficient, the drivability is apt to be impaired on the road having the high friction coefficient.

The present invention has been made in view of the above-described disadvantages, and it is an object of the present invention to provide a vehicle driving force control device capable of ensuring excellent drivability and reducing disorder of behavior of a vehicle due to an unexpected slipping of tire and ensuring stability of the vehicle and reducing driver's burden without traction control under any road surface condition.

SUMMARY OF THE INVENTION

Accordingly, it is an object of the present invention to provide a vehicle driving force control device which includes road surface friction coefficient estimation means for estimating a road surface friction coefficient, driving intention detection means for detecting a driving intention of a driver, driving output setting means for variably setting a driving output in accordance with the road surface friction coefficient and the driving intention, and actuator control means for controlling an operation of an actuator in accordance with the driving output set in the driving output setting means.

The above and other objects, features and advantages of the invention will become more clearly understood from the following description referring to the accompanying drawings.

DESCRIPTION OF THE PREFERRED EMBODIMENTS

Hereinafter, a first embodiment of the present invention will be described with reference to FIGS. 1 to 5.

Figure 1:
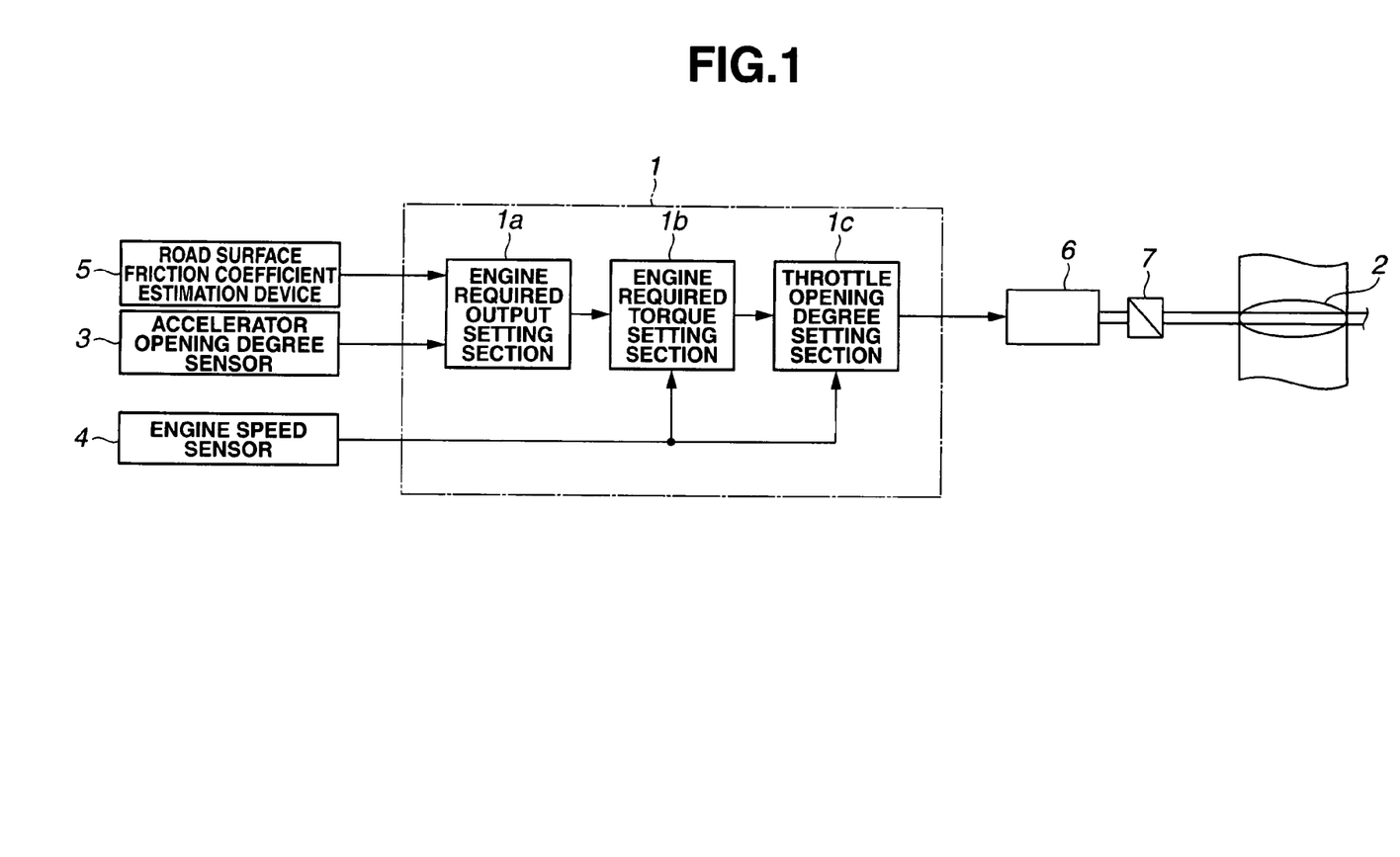
FIG. 1 is a functional block diagram illustrating a throttle valve control device according to a first embodiment of the present invention.

In FIG. 1, a throttle valve control device 1 functions as a driving force control device which controls a throttle opening degree of an electronic controlled throttle valve 2 arranged in an intake system of an engine. To the throttle valve control device 1, an accelerator opening degree sensor 3 as driving intention detection means, an engine speed sensor 4, and a road surface friction coefficient estimation device 5 are connected.

The electronic controlled throttle valve 2 which is arranged to a throttle body of the engine is, for example, connected to a throttle motor 6 such as a direct current motor through a gear mechanism 7, and throttle motor 6 is driven by the throttle valve control device 1.

The road surface friction coefficient estimation device 5 functions as road surface friction coefficient estimation means, estimates road surface friction coefficient using a calculation method, for example, a calculation method (an estimation method of road surface friction coefficient using adaptive control) disclosed in Japanese Unexamined Patent Application Publication No. 8-2274 which has already been applied by the applicant, and outputs the road surface friction coefficient to the throttle valve control device 1.

The throttle valve control device 1 includes main components, that is, an engine required output setting section 1a, an engine required torque setting section 1b, and a throttle opening degree setting section 1c.

To the engine required output setting section 1a, an accelerator opening degree is inputted from the accelerator opening degree sensor 3 and road surface friction coefficient is inputted from the road surface friction coefficient estimation device 5.

Figure 2A:
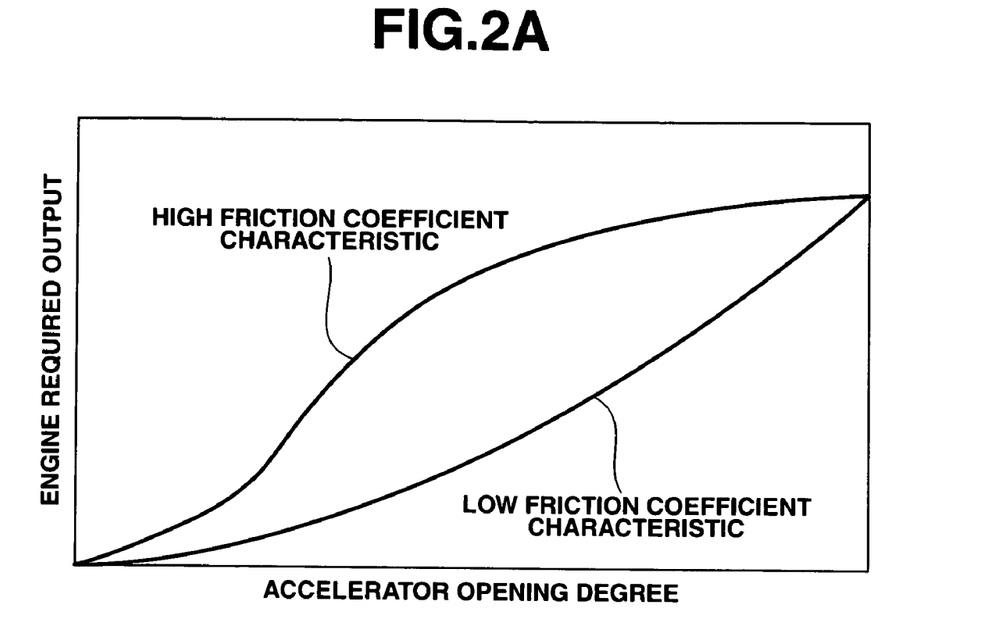
FIG. 2A is a characteristic view illustrating an engine required output set in accordance with road surface friction coefficient and an accelerator opening degree according to the first embodiment of the present invention.

If, for example, as illustrated in FIG. 2A, road surface friction coefficient inputted from the road surface friction coefficient estimation device 5 exceeds a previously set value, a characteristic of an engine required output to a previously set accelerator opening degree on a high friction coefficient road is selected, and on the contrary. If the road surface friction coefficient is less than the previously set value, a characteristic of an engine required output to a previously set accelerator opening degree on a low friction coefficient road is selected. Thus, based on the selected characteristic, the engine required output corresponding to the accelerator opening degree at the time is set and outputted to the engine required torque setting section 1b.

Figure 2B:
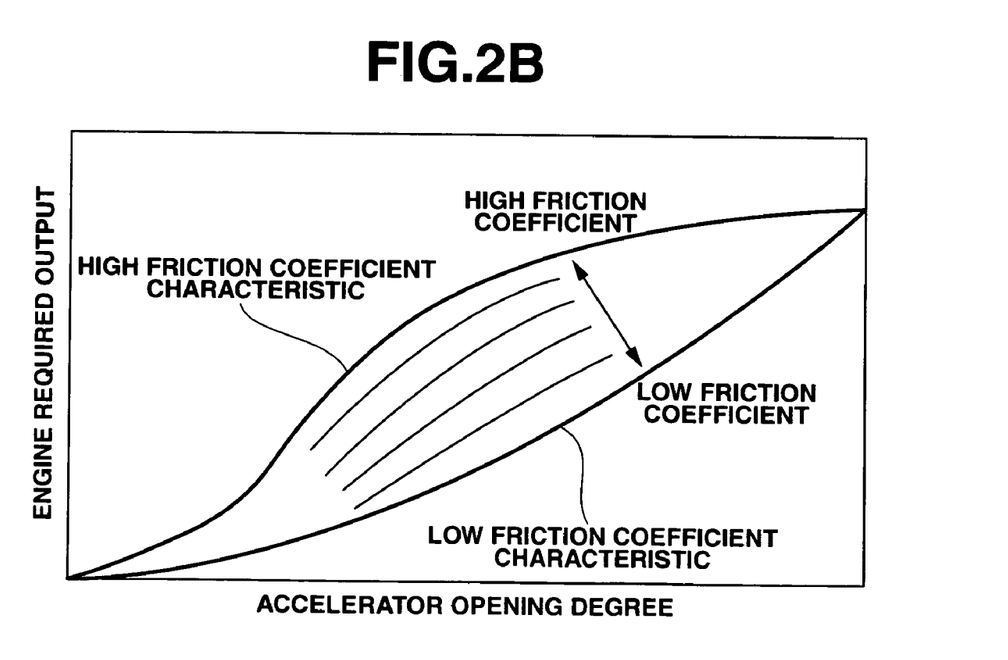
FIG. 2B is a characteristic view illustrating an engine required output set in accordance with road surface friction coefficient and an accelerator opening degree different from those in FIG. 2A according to the first embodiment of the present invention.

In the FIG. 2A, 2B, the characteristic of the engine required output is set such as a convex upward with the accelerator opening degree if the road surface friction coefficient is high, and the characteristic of the engine required output is set such as a convex downward curve with the accelerator opening degree if the road surface friction coefficient is low.

The characteristic of the engine required output can be previously set, for example, as illustrated in FIG. 2B, characteristics in a case of high friction coefficient and low friction coefficient roads respectively, and by an interpolation calculation based on the value of the road surface friction coefficient from the road surface friction coefficient estimation device 5, an engine required output corresponding to the road surface friction coefficient from the road surface friction coefficient estimation device 5 at the accelerator opening degree at the time can be set.

In either case of the above-described FIG. 2A or FIG. 2B, under a certain accelerator opening degree, if the road surface friction coefficient is high, the engine required output is set to a high value, and if the road surface friction coefficient is low, the engine required output is set to a low value. That is, on a road having high friction coefficient, drivability can be well retained by setting the engine required output to be high from a region where an accelerator operation amount is small. On the other hand, on a road having low friction coefficient, because the operation amount of the accelerator opening degree until a vehicle becomes to have a slipping tendency can be set to be greater than the case of the road having the high friction coefficient, even if a driver roughly operates the accelerator, the vehicle hardly slips and the driver's burden in driving can be reduced.

To the engine required torque setting section 1b, an engine speed is inputted from the engine speed sensor 4 and an engine required output is inputted from the engine required output setting section 1a.

Figure 3:
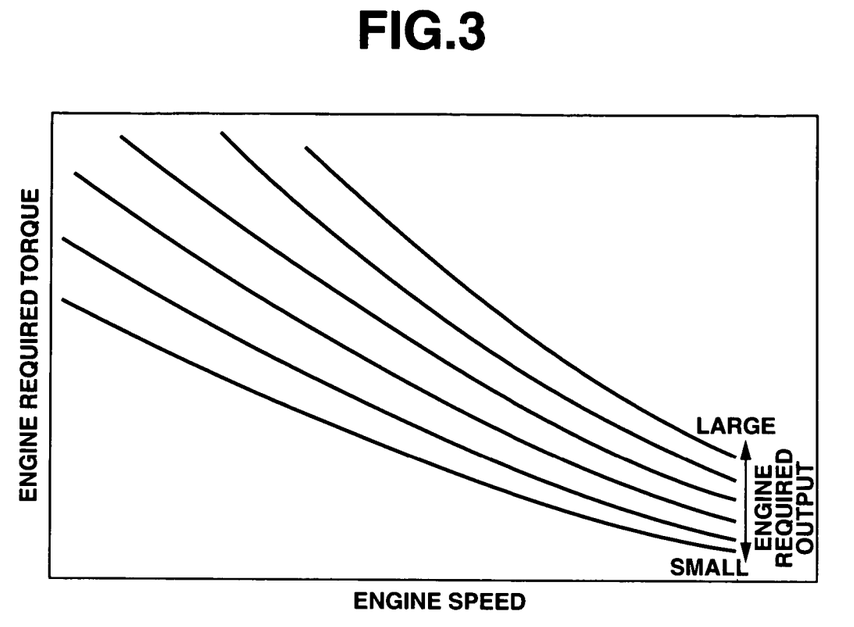
FIG. 3 is a characteristic view illustrating an engine required torque set in accordance with an engine required output and an engine speed according to the first embodiment of the present invention.

Then, for example, as illustrated in FIG. 3, a previously set map for converting an engine required output into a engine required torque is referred to, an engine required output at an engine speed at a time is converted into an engine required torque and set, and outputted to the throttle opening degree setting section 1c.

That is, in this embodiment, driving output setting means is configured with the engine required output setting section 1a and the engine required torque setting section 1b.

To the throttle opening degree setting section 1c, an engine speed is inputted from the engine speed sensor 4 and an engine required torque is inputted from the engine required torque setting section 1b.

Figure 4:
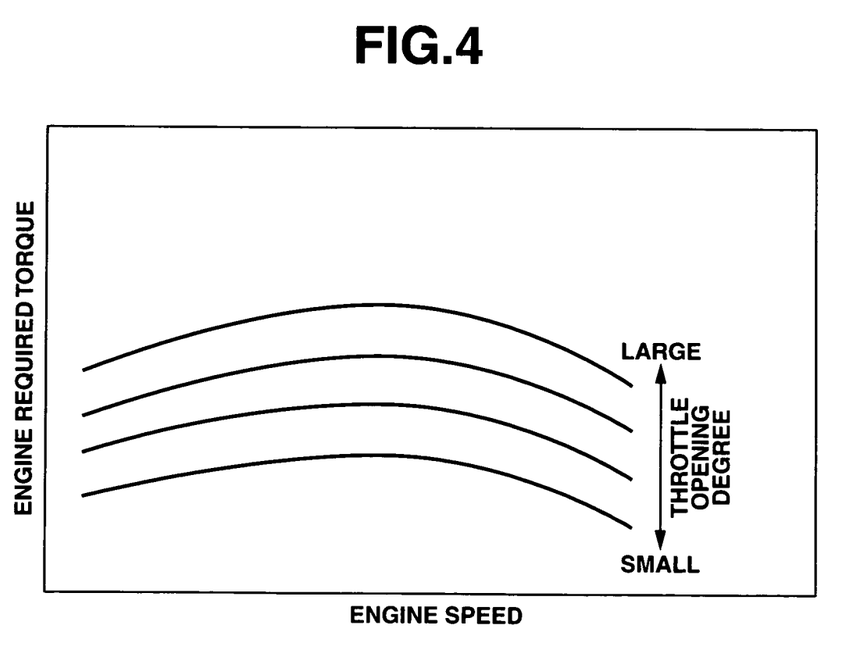
FIG. 4 is a characteristic view illustrating a throttle opening degree set in accordance with an engine speed and an engine required torque according to the first embodiment of the present invention.

Then, for example, as illustrated in FIG. 4, a previously set map for calculating a throttle opening degree from an engine speed and an engine required torque is referred to, the throttle opening degree is set and a signal corresponding to the throttle opening degree is outputted to the throttle motor 6. That is, in this embodiment, the throttle opening degree setting section 1c is provided as actuator control means.

Figure 5:
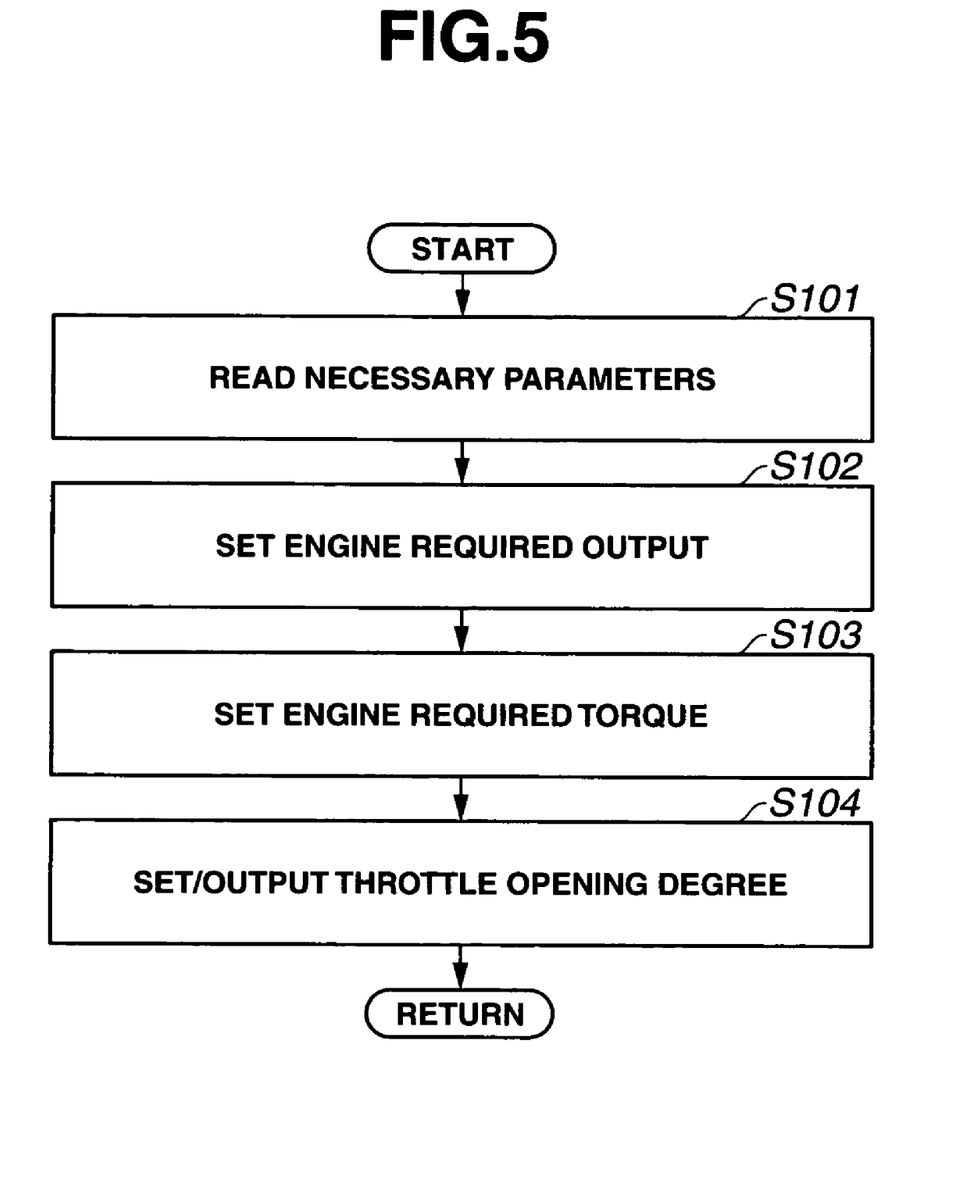
FIG. 5 is a flowchart illustrating a throttle valve control program according to the first embodiment of the present invention.

Then, the throttle valve control carried out in the above-described throttle valve control device 1 will be described with reference to a flowchart of FIG. 5. First, at step (hereinafter, simply referred to as "S") 101, necessary parameters are read, and at S102, the engine required output setting section 1a, based on an accelerator opening degree and road surface friction coefficient, and with reference to FIG. 2A or FIG. 2B, sets an engine required output.

Then, at step SI 03, the engine required torque setting section 1b, based on an engine speed and the engine required output, for example, with reference to the map illustrated in FIG. 3, sets an engine required torque.

At step S104, the throttle opening degree setting section 1c, based on the engine speed and the engine required torque, for example, with reference to the map illustrated in FIG. 4, sets a throttle opening degree, outputs a signal corresponding to the throttle opening degree to the throttle motor 6. Then the program is exited.

As described above, according to the first embodiment of the present invention, because the characteristic of the engine required output to the accelerator opening degree can be set to a varied characteristic depending on the road surface friction coefficient and controlled by the engine required output, it is not necessary to depend on the traction control excessively, and under any road surface condition, excellent drivability can be ensured and disorder of behavior of the vehicle due to an unexpected slipping of tire can be reduced. Accordingly, the stability of the vehicle can be ensured and the driver's burden can be reduced.

Figure 6:
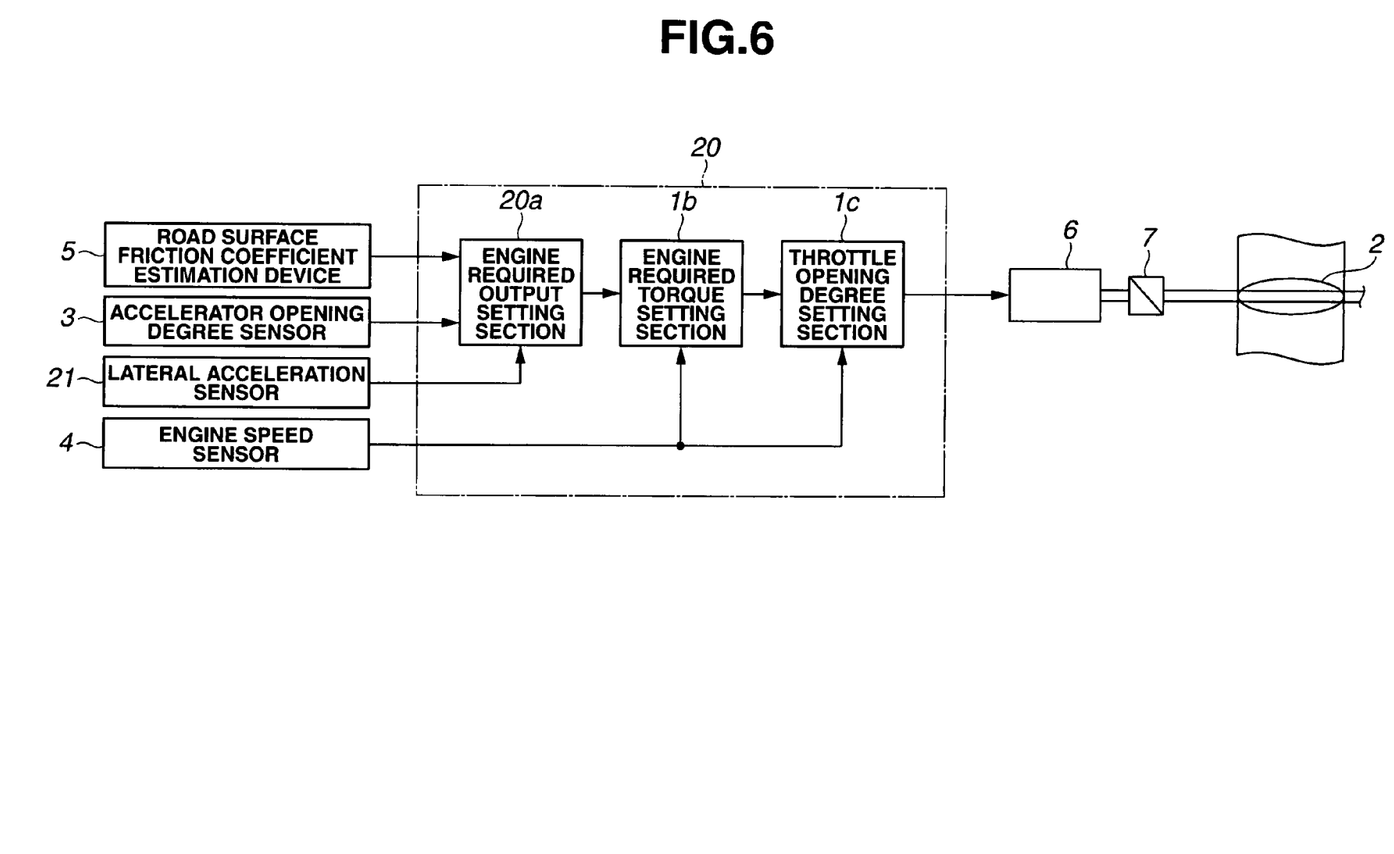
FIG. 6 is a functional block diagram illustrating a throttle valve control device according to a second embodiment of the present invention.
Figure 7A:
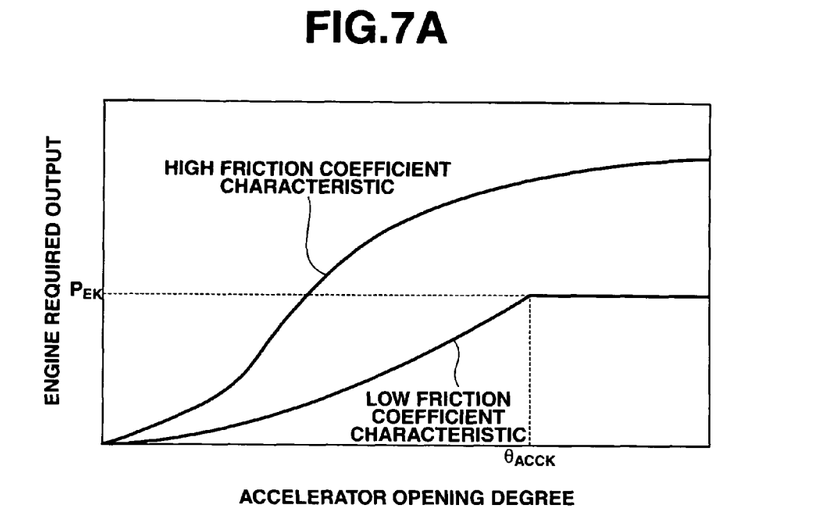
FIG. 7A is a characteristic view illustrating an engine required output set in accordance with road surface friction coefficient and an accelerator opening degree according to the second embodiment of the present invention.

Next, a second embodiment of the present invention will be described with reference to FIGS. 6, 7A, and 7B. The second embodiment of the present invention is different from the above-described first embodiment in a characteristic of the engine required output set in accordance with the road surface friction coefficient and the accelerator opening degree. Other configurations and operation are similar to those described in the first embodiment and therefore, the same reference numerals are given to them and their descriptions are omitted.

That is, to a throttle valve control device 20 according to the second embodiment, in addition to the accelerator opening degree sensor 3 as the driving intention detection means, the engine speed sensor 4, and the road surface friction coefficient estimation device 5 described in the above first embodiment, a lateral acceleration sensor 21 is connected as lateral acceleration detection means.

The throttle valve control device 20 includes main components, that is, an engine required output setting section 20a, the engine required torque setting section 1b, and the throttle opening degree setting section 1c. To the engine required output setting section 20a, an accelerator opening degree is inputted from the accelerator opening degree sensor 3, road surface friction coefficient is inputted from the road surface friction coefficient estimation device 5, and a lateral acceleration is inputted from the lateral acceleration sensor 21.

In the engine required output setting section 20a, similarly to the first embodiment, the characteristic view of the engine required output set in accordance with the road surface friction coefficient and the accelerator opening degree is set. However, for example, as illustrated in FIG. 7A, to the characteristic of the engine required output set in accordance with the road surface coefficient friction and the accelerator opening degree, a map of a characteristic being provided with an upper limit is set to enable traveling on a certain road surface friction coefficient without slipping. That is, in the embodiment illustrated in FIG. 7A, in a case in which a low friction coefficient characteristic is selected, if the accelerator opening degree is θ ACCK or more, the engine required output is limited to P EK. Then, even if the driver further presses the accelerator pedal, in order to prevent slipping, the characteristic of the engine required output is limited to become P EK (in the case of the characteristic illustrated in FIG. 7A, the lateral acceleration sensor 21 is not necessary).

Figure 7B:
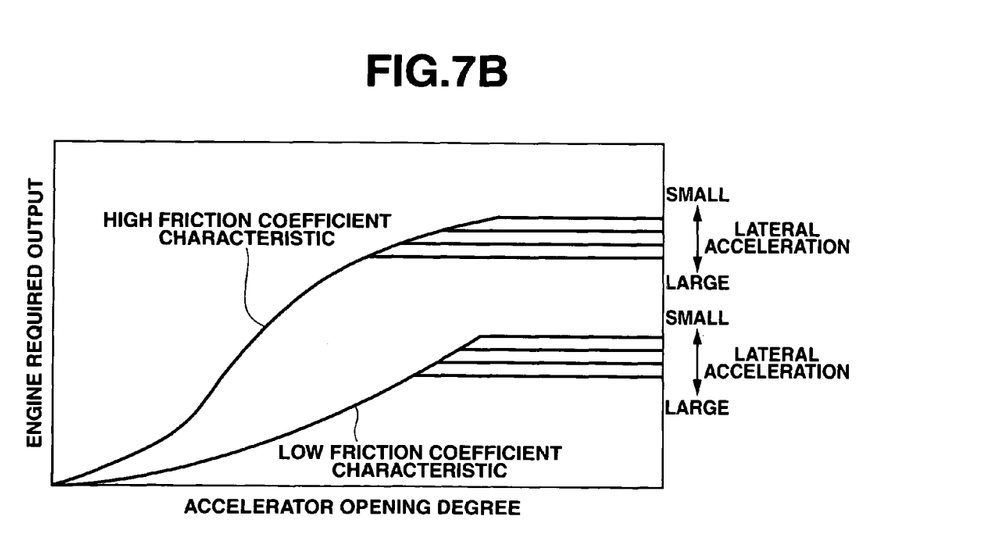
FIG. 7B is a characteristic view illustrating an engine required output set in accordance with road surface friction coefficient and an accelerator opening degree different from those in FIG. 7A according to the second embodiment of the present invention.

Alternatively, as illustrated in FIG. 7B, a map in which the above-described upper limit varies depending on values of the lateral acceleration can be set. That is, if the lateral acceleration increases, the front-rear driving force is limited to be smaller due to relation of the friction circle. On the contrary, if the lateral acceleration decreases, the front-rear driving force becomes greater. Accordingly, by reflecting the relationship to the upper limit, the control corresponding to actual traveling state can be realized. When the upper limit is variably set depending on the values of the lateral acceleration, it is not limited to set the upper limit to both the high friction coefficient characteristic and the low friction coefficient characteristic as described in the embodiment, but the upper limit can be set to either of the high friction coefficient characteristic or the low friction coefficient characteristic.

The upper limits are set in accordance with not only the lateral acceleration the but also the lateral acceleration and the road surface friction, so the engine required torque can be set different values depending on the road friction coefficient, even if the lateral accelerations are same condition.

If the engine required torque is corrected by means of multiplying the engine required torque by a correcting coefficient calculated depending on the lateral acceleration, it might be that the engine required torque is lowered more than necessary in a region where the accelerator opening degree is small. But the engine required torque needs not to be lowered more than necessary in a region where the accelerator opening degree is small, because the upper limits do not depend on the accelerator opening degree.

As described above, also in the second embodiment of the present invention, similar advantages to the above-described first embodiment can be obtained and further, the controllability corresponding to the actual traveling state can be performed.

In each embodiment, the throttle valve control device is exemplarily employed as the driving force control device. However, the present invention is applicable to other driving force control devices, for example, a motor driving force control device of an electric vehicle or a hybrid vehicle.

As described above, in the driving force control device for vehicles according to the present invention, without depending on a traction control, under any road surface condition, the excellent drivability can be ensured, and the disorder of behavior of the vehicle due to an unexpected slipping of tire can be reduced. Accordingly, the stability of the vehicle can be ensured and the driver's burden can be reduced.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle driving force control device comprising:
    road surface friction coefficient estimation means for estimating a road surface friction coefficient;
    driving intention detection means for detecting a driving intention of a driver;
    driving output setting means for variably setting a driving output in accordance with the road surface friction coefficient and the driving intention; and
    actuator control means for controlling an operation of an actuator in accordance with the driving output set in the driving output setting means, and wherein the driving output is set such as a convex upward curve with the driving intention if the road surface friction coefficient is high, and the driving output is set such as a convex downward curve with the driving intention if the road surface friction coefficient is low.

2. The vehicle driving force control device according to claim 1, the vehicle driving force control device further comprises lateral acceleration detection means for detecting a lateral acceleration acting on the vehicle, wherein the driving output setting means sets an upper limit to the driving output in accordance with the lateral acceleration and the road surface friction coefficient.

3. The vehicle driving force control device according to claim 1, wherein the actuator control means sets a throttle opening degree of an electronic controlled throttle valve.

4. A vehicle driving force control device comprising:
    road surface friction coefficient estimation means for estimating a road surface friction coefficient;
    an accelerator opening degree sensor;
    driving output setting means for variably setting a driving output in accordance with the road surface friction coefficient and an accelerator opening degree sensed by the accelerator opening degree sensor; and
    a throttle actuator which sets a throttle opening degree setting in accordance with the driving output set in the driving output setting means, wherein the driving output is set such as a convex upward curve with the driving intention if the road surface friction coefficient is high, and the driving output is set such as a convex downward curve with the driving intention if the road surface friction coefficient is low.

5. The vehicle driving force control device according to claim 4, further comprising lateral acceleration detection means for detecting a lateral acceleration acting on the vehicle, and the driving output setting means sets an upper limit to the driving output in accordance with the lateral acceleration and the road surface friction coefficient.

6. A vehicle driving force control device comprising:
    road surface friction coefficient estimation means for estimating a road surface friction coefficient;
    driving intention detection means for detecting a driving intention of a driver;
    driving output setting means for variably setting a driving output in accordance with the road surface friction coefficient and the driving intention;
    actuator control means for controlling an operation of an actuator in accordance with the driving output set in the driving output setting means; and
    lateral acceleration detection means for detecting a lateral acceleration acting on the vehicle, wherein the driving output setting means sets an upper limit to the driving output in accordance with the lateral acceleration and the road surface friction coefficient, and wherein the driving output is set such as a convex upward curve with the driving intention if the road surface friction coefficient is higher than a preset value.

7. The vehicle driving force control device according to claim 6, wherein the driving output is set such as a convex downward curve with the driving intention if the road surface friction coefficient is lower than a preset value.

* * * * *